3,382,128
HEAT SEALABLE POLYSTYRENE PELLICLES
Lewis F. Bogle, Enfield, and Thomas F. Sincock, Simsbury, Conn., assignors to Monsanto Company, a corporation of Delaware
No Drawing. Filed June 5, 1963, Ser. No. 285,575
14 Claims. (Cl. 156—306)

ABSTRACT OF THE DISCLOSURE

A block-resistant, heat sealing composition for polystyrene comprising a normally solid, organic compound which melts between about 120° F. and 240° F., and has adequate solubility for heat sealing the polystyrene within this range. A modifying agent may be optionally included to enhance anti-block properties.

---

This invention relates to the art of bonding polystyrene film and sheet and provides a novel adhesive composition for accomplishing the bond. More particularly the invention concerns an improved process and a bonding composition suitable for providing a tenacious seal between polystyrene film or sheet by heat sealing it under moderate conditions, and likewise concerns the coated polystyrene pellicles obtained thereby.

Briefly stated the bonding composition employed in this invention comprises a normally solid but relatively low melting organic compound such as dicyclohexyl phthalate, preferably in admixture with an anti-block agent such as one or more fatty acid amides.

Heretofore, there has been a long felt need for an efficient commercially acceptable heat seal process, particularly for use with oriented polystyrene film and sheet. Heat sealing of biaxially oriented polystyrene by conventional heat sealing equipment has been practiced in the past. However, an adequate seal has been difficult to obtain as even under carefully controlled conditions the resultant seal has poor aesthetic appeal and degraded functional properties.

In order to be effective and functional, a heat seal coating for oriented polystyrene must seal at temperatures low enough so as not to distort the oriented polystyrene, that is, the temperature of the main body of the substrate should not exceed about 200° F. for any appreciable period, yet the coating must not block or stick at temperatures below about 120° to 140° F. the coating must be clear, adherent, non-tacky and not injurious to the normal physical properties of the film such as tensile strength. Many coating systems have been studied in this connection, all unsuccessfully. For instance, styrene-butadiene copolymers are clear, adherent and heat sealable but they block; vinyl acetate polymers are clear and adherent but block and result in brittle seals.

It is an object of the invention to provide an improved composition and a tractable process suitable for efficiently bonding polystyrene film and sheet, and especially biaxially oriented polystyrene, upon the application of moderate heat and pressure. It is also an object of the invention to provide a coated polystyrene film or sheet which is capable of forming a tenacious heat seal with itself or with another polystyrene article when heat and pressure are applied. Other objects of the invention as well as the nature, operation and advantages thereof will further appear from the following detailed description.

The pellicular polystyrene materials suitable for use in the present invention are well known oriented or unoriented thin, flexible sheets or films made by the polymerization of styrene and extrusion or casting of the resulting polymer in film form. In making biaxially oriented pellicular material, the latter is further stretched or cold drawn about 50 to 300% of its original length along each of its two principal axes in an otherwise known manner so as to cause molecular orientation and hence an improvement in both strength and clarity. When both surfaces of the pellicular material to be bonded are coated with the bonding composition, biaxially oriented polystyrene film or web having a thickness range between about 0.001 and 0.002 inch is particularly suitable for use in the invention. However, when only one of the surfaces to be bonded is coated with the bonding composition, then the preferred thickness of the second, uncoated polystyrene pellicle may be of any gauge from about 0.001 to about 0.03 inch. Bonds may also be obtained using base sheets having a thickness in excess of the preferred limits stated above, both such resulting bonds may tend to be brittle, making the seal less desirable for uses where a bending movement of the sealed bond is foreseeable or contemplated.

When carrying out the invention it is feasible to employ as the bonding agent in the novel bonding composition any non-volatile material which is a solvent for polystyrene when activated by heat at elevated temperatures, e.g., between about 120° and about 250° F., preferably between about 180° and 240° F., but which does not appreciably solvate the plastic at normal temperatures up to at least about 110° F. It has been discovered that the normally solid esters formed from phthalic acid and a monocyclic alcohol or phenol, i.e., dicyclohexyl phthalate (m.p. about 150° F.) and diphenyl phthalate (m.p. about 175° F.) are particularly useful. However, also useful are the normally solid esters of phosphoric acid (e.g., triphenyl phosphate), of fatty acids (e.g., methyl stearate), of salicylic acid (e.g., phenyl salicylate) as well as other normally solid materials melting below about 240° F., preferably between about 130° and 190° F., and having the proper solvent power for polystyrene at elevated temperature, (e.g., toluene sulfonamides such as n-cyclohexyl p-toluenesulfonamide). Normally liquid esters, such as dibutyl phthalate, also can effect a seal when coated on polystyrene and heated. However, such liquids are not so desirable for sealing polystyrene film since sheets coated therewith are tacky and will block and tend to seal prematurely when rolled up for shipment or storage.

Any suitable volatile liquid solvent which dissolves the particular bonding agent used and which does not affect the polystyrene may be employed to form a liquid solution for application to the plastic substrate. Preferred solvents are the lower molecular weight alkanols having from 1 to about 5 carbon atoms, e.g., methanol, isopropanol, n-pentanol, etc. Other solvents that do not affect polystyrene at the coating temperature, e.g., the $C_5$-$C_7$ alkanes such as pentane or heptane, are similarly suitable. In brief, the liquid solvent used should be one which dissolves the solid ingredients of the coating composition but not the polystyrene, and which after application of the bonding composition to the pellicle readily evaporates from the applied wet coating at temperatures between about 50° and 200° F. (e.g., one which has a boiling point between about 90° and 250° F.).

Anti-block agents such as saturated or unsaturated fatty acid amides or mixtures thereof are also desirable ingredients of the coating composition where a high degree of resistance to blocking is desired. Fatty acid amides having from 18 to 22 carbon atoms are preferred for this purpose. Specific examples include stearamide, oleamide and erucamide. Other anti-block agents known to the art that may be used include stearate soaps such as calcium stearate, appropriate waxes, or even colloidal silica which can be incorporated in the coating composition as a dispersion.

The sealing compositions useful herein may contain, on a solvent-free basis, from about 90 to 60% by weight of the normally solid esters such as dicyclohexyl phthalate or diphenyl phthalate and correspondingly about 10 to 40% by weight of saturated or unsaturated fatty acid amides having from 18 to 22 carbon atoms or other anti-block agent. However, when a particularly high degree of resistance to blocking is not required or where high storage temperatures are not anticipated, adequate heat sealing compositions can be formulated without including therein any separate anti-block agent.

A clear solution of a particularly effective bonding composition may be obtained by dissolving the fatty acid amide and the selected phthalic acid ester consecutively with agitation in methyl alcohol or similar low boiling solvent. The solution step is conveniently carried out at a temperature which may range from room temperature (about 60° to 80° F.) up to the boiling point of the solvent, a moderately elevated temperature such as 120° F. being desirable to speed up the process. Refluxing as well as preparation of the solution under pressure may be used if it is desired to use temperatures near or above the normal boiling point of the solvent. The coating solution conveniently may contain about 0.5 to 5 percent by weight of the heat sealing compound and, for instance, about 0.1 to 2 percent by weight of the anti-blocking agent.

In order to produce a coated polystyrene sheet material suitable for heat sealing, a thin coating of the bonding composition is applied to the base sheet material and dried allowing the solvent to evaporate. The coating is applied in such a manner that the wet coating weight is preferably about 1450 to about 1700 micrograms per square inch of polystyrene base sheet material, and the dry coating weight produced may desirably be in the range from about 40 to 60 micrograms per square inch of polystyrene base. The low coating weights needed can be applied very effectively by rotogravure using engraved cylinders, such as those having about 150 to 200 lines per inch, by brushing, dipping, spraying or any other conventional coating process may be employed if desired. Drying with forced hot air or other conventional means may be employed to speed evaporation of the volatile solvent from the applied coating. Alternately, though application of the sealing material from solution is preferred, it is possible to apply the normally solid sealing composition as a hot melt, allowing the applied coating to dry or solidify on the substrate upon cooling. When dry, the coated plastic sheet or film can be wound on rolls and so shipped or stored without risk of blocking prior to use.

Once the pellicular polystyrene base is coated with the bonding composition, the heat sealing process of the invention may be accomplished by mating or overlapping the coated surface with another coated or uncoated polystyrene surface, followed by the application of heat and pressure. The bonding process of the invention is suitable for surface bonding two or more articles of oriented or unoriented polystyrene material, but is particularly useful for bonding together biaxially oriented polystyrene sheets or films.

The invention is more fully illustrated by the following examples:

EXAMPLE I

A satisfactory bonding composition is prepared by charging 80 pounds of secondary butyl alcohol into a 50 gallon open drum which is provided with an air driven agitator and multiple heaters. While agitation is taking place, the temperature is raised from room temperature to about 120° F., 1.75 pounds of octadecanamide are slowly added and agitation continued while the octadecanamide dissolves. 7 pounds of dicyclohexyl phthalate are now slowly added. 100 additional pounds of secondary butyl alcohol are added and the temperature is allowed to build up to 120° F. again. When this temperature is attained, 160 additional pounds of secondary butyl alcohol are added and stirring is continued until a clear solution results. The final composition is composed of about 2.0 weight percent dicyclohexyl phthalate, about 0.5 weight percent octadecanamide and about 97.5 weight percent secondary butyl alcohol.

EXAMPLE II

The bonding composition of Example I is applied using an etched cylinder which picks up the coating from a reservoir and deposits it on a biaxially oriented polystyrene web 0.001 inch thick. The web is pressed against the etched cylinder by a hard rubber pressure roll. The coating is transferred to the web at the contact area of the two rolls after which it is carried through a forced hot air oven and subsequently rewound. Because of the nature of the coating composition, i.e., low solids content and highly volatile solvent, high machine speeds and therefore economical production are possible.

EXAMPLE III

Samples of the biaxially oriented polystyrene film coated as in Example II can be sealed by the application of heat and pressure, facing either coated side against coated side or uncoated side against coated side. One of the advantages of this composition is that it needs only to be applied to one side of the film to effect sealing.

The coated film was readily heat sealed by using a "Sentinel" heat-sealer, manufactured by Packaging Industries, Montclair, N.J. This device provides suitable control of sealing pressure, dwell time, and temperature for the sealing jaws in an otherwise known manner.

Using the "Sentinel" sealer, a coated sheet is placed against an uncoated sheet and the resulting sandwich inserted between the upper aluminum jaw and the lower hard rubber jaw of the sealing mechanism. In this case only the aluminum upper jaw is heated. The jaws are brought together with a force of 10 p.s.i. at 225° F. and held for 2 seconds.

The resultant seals were then evaluated on an Instron Tester using a cross head speed of 12 inches per minute. Five samples sealed under these conditions had very good bond strength averaging 124 grams/inch.

Controls of uncoated polystyrene film did not form any seal at all at these sealing conditions.

Table I provides a summary of additional heat sealing results obtained when a film of coated 0.001 inch biaxially oriented polystyrene as produced in Example II is mated with a like coated film using the "Sentinel" sealer under the various conditions of temperature, pressure and dwell time stated.

TABLE 1.—POLYSTYRENE HEAT SEALED WITH DICYCLOHEXYL PHTHALATE

| Pressure (p.s.i.) | Temperature (° F.) | Dwell Time (seconds) | Bond Strength (gm./inch) |
|---|---|---|---|
| 10 | 215 | 1 | (¹) |
| 10 | 215 | 2 | 44 |
| 10 | 215 | 3 | 63 |
| 20 | 215 | 1 | (¹) |
| 20 | 215 | 2 | 63 |
| 20 | 215 | 3 | 143 |
| 30 | 215 | 1 | 43 |
| 30 | 215 | 2 | 181 |
| 30 | 215 | 3 | 196 |
| 10 | 225 | 1 | 50 |
| 10 | 225 | 2 | 124 |
| 10 | 225 | 3 | 187 |
| 20 | 225 | 1 | 135 |
| 20 | 225 | 2 | 187 |
| 20 | 225 | 3 | 189 |
| 30 | 225 | 1 | 103 |
| 30 | 225 | 2 | 159 |
| 30 | 225 | 3 | 218 |
| 10 | 235 | 1 | 114 |
| 10 | 235 | 2 | 143 |
| 10 | 235 | 3 | 240 |
| 20 | 235 | 1 | 133 |
| 20 | 235 | 2 | 190 |
| 20 | 235 | 3 | 267 |
| 30 | 235 | 1 | 153 |
| 30 | 235 | 2 | 316 |
| 30 | 235 | 3 | 331 |
| 10 | 245 | 1 | 194 |
| 10 | 245 | 2 | 205 |
| 10 | 245 | 3 | 331 |
| 20 | 245 | 1 | 146 |
| 20 | 245 | 2 | 286 |
| 20 | 245 | 3 | 357 |
| 30 | 245 | 1 | 272 |
| 30 | 245 | 2 | 380 |
| 30 | 245 | 3 | 338 |
| 10 | 255 | 1 | 265 |
| 10 | 255 | 2 | (²) |
| 10 | 255 | 3 | (²) |
| 20 | 255 | 1 | 249 |
| 20 | 255 | 2 | (²) |
| 20 | 255 | 3 | (²) |
| 30 | 255 | 1 | 229 |
| 30 | 255 | 2 | (²) |
| 30 | 255 | 3 | (²) |

¹ No seal.
² Unmolds.

It will be noted from Table I that the novel compositions uniformly provide excellent bonding by effecting the heat seal at temperatures between about 225° and about 245° F. and at sealing pressures of 20 or 30 (or more) pounds per square inch. And even at lower temperatures such as 215° F. or at lower sealing pressures such as 10 p.s.i. or less good seals can be obtained if suitably longer dwell times and higher sealing pressures or temperatures are used, so as to compensate for the reduction in one process variable by a suitable increase in one or more of the other variables. On the other hand, it can be seen that the particular polystyrene film used unmolds, i.e., loses its biaxial orientation, if exposed to temperatures above about 250° F. for more than one second.

Unlike previously known coating compositions the bonding coating of this invention does not adversely affect the physical properties of the polystyrene base material when applied thereto. Visible light transmission is unaltered, and even after prolonged periods of exposure only a very slight discoloration occurs which is equivalent to that obtained with uncoated controls. Water vapor permeability of the base sheet material is not affected by the coating, nor is the oxygen transmission rate. No odor is imparted to the base material by the coating and the coated film is considered tasteless. Blocking does not occur under standard test conditions of 24 hours at 1 pound per square inch pressure at 120° F. Test rolls of the coated film were stored at 120° F. for three months without any blocking developing. The coating has no effect on the tensile and elongation of the base material, nor is the coefficient of friction altered.

The heat sealable coated polystyrene sheet material produced by the invention may be employed in a wide variety of uses which require a clear transparent sheet material, such as box overwrap in the packaging art.

In the absence of contrary indications, all proportions of materials are stated herein on a weight basis.

Although the invention has been described in connection with certain preferred embodiments, it is to be understood that variations and modifications may be resorted to by those skilled in the art without departing from the spirit hereof. The scope of the present invention is particularly pointed out in the appended claims.

What is claimed is:

1. A coated, block resistant, biaxially oriented polystyrene pellicle suitable for heat sealing, having a thin surface coating consisting essentially of a major portion of a non-volatile, normally solid organic plasticizer which melts between the range of about 120° F. and about 240° F. and has adequate solubility for heat sealing the polystyrene within said range, without appreciably solvating said polystyrene at temperatures below about 110° F. in order to preserve block resistance until heat sealed, by solidification of said solid in environmental temperatures below about 110° F.

2. Coated polystyrene pellicle according to claim 1 wherein said normally solid material is n-cyclohexyl p-toluenesulfonamide.

3. Coated polystyrene pellicle according to claim 1 wherein said normally solid material is triphenyl phosphate.

4. Coated polystyrene pellicle according to claim 1 wherein said pellicle is a film of about 0.001 to 0.002 inch thickness and wherein said normally solid material is an ester of the group consisting of dicyclohexyl phthalate and diphenyl phthalate.

5. A pellicular biaxially oriented polystyrene article having a thin surface coating consisting essentially of a major proportion of a normally solid ester, selected from the group consisting of dicyclohexyl phthalate and diphenyl phthalate, and a minor proportion of a monomeric fatty acid amide having about 18 to 22 carbon atoms per molecule.

6. A liquid sealing coating composition for heat sealing biaxially oriented polystyrene at temperatures between about 215° F., and 250° F. without destroying the orientation at said temperatures, said composition consisting essentially of about 60 to 90 parts by weight of a normally solid ester of phthalic acid selected from group consisting of dicyclohexyl phthalate and diphenyl phthalate, and about 40 to 10 parts by weight of monomeric, saturated fatty acid amide having from about 18 to 22 carbon atoms per molecule, said composition in the solid state being block resistant at environmental temperatures below about 110° F.

7. A sealing composition according to claim 6 wherein said ester and said amide are in solution in a volatile solvent that is essentially inert to polystyrene at room temperature.

8. A sealing composition according to claim 7 wherein to solvent is an alkanol of 1 to 5 carbon atoms.

9. A sealing composition according to claim 7 wherein the solvent is secondary butyl alcohol.

10. A sealing composition according to claim 7 wherein the amide is octadecanamide.

11. The process of bonding together a plurality of biaxially oriented polystyrene sheets without destroying the biaxial orientation, which comprises coating a surface of a biaxially oriented polystyrene sheet with a thin film of a liquid solution containing on a solvent free basis about 60 to 90 percent by weight of an ester of phthalic acid selected from the group consisting of dicyclohexyl phthalate and diphenyl phthalate, and about 40 to 10 percent by weight of a monomeric fatty anti-block agent, said ester and said anti-block agent being in solution in a concentration between about 0.5 and 5 percent by weight in a volatile organic solvent which is inert to polystyrene at room temperature, evaporating said solvent from the resulting coated sheet surface, mating said coated sheet surface with another surface to which it is to be bonded, and applying pressure and heat at a temperature between about 215° and 250° F. under heat sealing conditions until a bond strength of at least 100 gm./inch is obtained without destroying the biaxial orientation of the coated polystyrene sheet being sealed.

12. A process according to claim 11 wherein said liquid solution is applied to said polystyrene sheet in an amount sufficient to leave a dry coating weight of about 40 to 60 micrograms per square inch.

13. The process according to claim 11 wherein said anti-block agent is a fatty acid amide of about 18 to 22 carbon atoms per molecule.

14. The process according to claim 12 wherein the solvent in the coating solution is secondary butyl alcohol.

References Cited

UNITED STATES PATENTS

| | | | |
|---|---|---|---|
| 3,111,418 | 11/1963 | Gilbert | 117—15 |
| 2,486,756 | 11/1949 | Murphy et al. | 260—29.6 |
| 2,971,876 | 2/1961 | Phair. | |
| 3,138,509 | 6/1964 | Cox et al. | 156—307 X |
| 3,201,302 | 8/1965 | Williams et al. | 156—307 X |

FOREIGN PATENTS 646,200  11/1950  Great Britain.

OTHER REFERENCES

"Modern Plastics," Encyclopedia edition of September 1962, vol. 40, No. 1, 1A, pp. 456, 469, 472, 473, 476, 477.

Technical Bulletin 11B, 1955, pp. 1a, 1b, 1c, 3, 4, "Heat Seal Coatings and Adhesives," and "Versamide-Polyamine Resins," data sheet 11, 1966, pp. 1 and 2, Chemical Division, General Mills, Inc., Kankakee, Ill.

Bailey, J.: India Rubber World, vol. 118, pp. 225–231, May 1948.

Floyd, D. E., "Polyamide Resins," Reinhold, New York, N.Y., pp. 180–186.

"Plasticizers Chart–1948," Plastics Catalog Corp., 122 E. 42nd St., New York, N.Y.

EARL M. BERGERT, *Primary Examiner.*

C. B. COSBY, *Assistant Examiner.*

UNITED STATES PATENT OFFICE
CERTIFICATE OF CORRECTION

Patent No. 3,382,128

May 7, 1968

Lewis F. Bogle et al.

It is certified that error appears in the above identified patent and that said Letters Patent are hereby corrected as shown below:

Column 7, between lines 16 and 17, insert -- 2,608,542 8/1952 Smith------156—283 X --. Column 8, after line 16, insert -- Handbook of Material Tradenames, Zimmerman and Lavine, 1953 Edition, Industrial Research Service, Dover, New Hampshire, page 63.

Modern Plastics Encyclopedia, 1957, Plasticizers Chart, Vol. 35, No. 1A, Sept. 1957 pages 604, 605, 608, 609, 612, 613. --.

Signed and sealed this 14th day of October 1969.

(SEAL)
Attest:

Edward M. Fletcher, Jr.
Attesting Officer

WILLIAM E. SCHUYLER, JR.
Commissioner of Patents